(12) United States Patent
Miyata et al.

(10) Patent No.: US 10,565,512 B2
(45) Date of Patent: Feb. 18, 2020

(54) EVENT ANALYSIS APPARATUS, EVENT ANALYSIS METHOD AND COMPUTER PROGRAM PRODUCT

(71) Applicant: Yokogawa Electric Corporation, Musashino-shi, Tokyo (JP)

(72) Inventors: Yuuji Miyata, Musashino (JP); Yuichi Sakuraba, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 741 days.

(21) Appl. No.: 14/947,463

(22) Filed: Nov. 20, 2015

(65) Prior Publication Data

US 2016/0148111 A1 May 26, 2016

(30) Foreign Application Priority Data

Nov. 26, 2014 (JP) .................................. 2014-238695

(51) Int. Cl.
*G05B 23/02* (2006.01)
*G06N 7/00* (2006.01)
(Continued)

(52) U.S. Cl.
CPC ........... *G06N 7/005* (2013.01); *G05B 23/024* (2013.01); *G06F 11/0706* (2013.01);
(Continued)

(58) Field of Classification Search
CPC ............ G05B 23/0275; G05B 23/0251; G05B 23/0281; G05B 23/024; G06N 7/005; G06F 11/0706
See application file for complete search history.

(56) References Cited

U.S. PATENT DOCUMENTS

| 2003/0078686 A1* | 4/2003 | Ma ............................ G06F 7/02 |
| | | 700/91 |
| 2003/0110007 A1* | 6/2003 | McGee ............... G06F 11/0709 |
| | | 702/179 |

(Continued)

FOREIGN PATENT DOCUMENTS

| EP | 2 749 980 A1 | 7/2014 |
| EP | 2 797 034 A2 | 10/2014 |

(Continued)

OTHER PUBLICATIONS

Yamaguchi, T et al. "Data based construction of Bayesian network for fault diagnosis of event-driven systems," Proceedings of SICE Annual Conference 2010, Teipei, 2010 [online] [retrieved online Jul. 6, 2018] <URL: http://ieeexplore.ieee.org/stamp/stamp.jsp?tp=&arnumber=5603051&isnumber=5601973> (Year: 2010).*

(Continued)

*Primary Examiner* — Alexey Shmatov
*Assistant Examiner* — Fen Christopher Tamulonis
(74) *Attorney, Agent, or Firm* — Sughrue Mion PLLC

(57) ABSTRACT

An associated event group preparation unit calculates a degree of association between the events on the basis of an event matrix, and prepares an associated event group for each event. A cause-and-effect relationship model establishment unit establishes a probabilistic cause-and-effect relationship model by a Bayesian network on the basis of the event matrix, for each associated event group. An improvement candidate pattern receiving unit receives a setting of an improvement candidate pattern in which a condition of an event to be set as an improvement candidate is determined by attributes of the base point event and the associated event and a conditional probability between the base point event and the associated event. A pattern analysis unit extracts a probabilistic cause-and-effect relationship model conforming to any one of the set improvement candidate patterns, (Continued)

from the established probabilistic cause-and-effect relationship models for each event.

7 Claims, 16 Drawing Sheets

(51) Int. Cl.
*G06Q 10/06* (2012.01)
*G06N 5/04* (2006.01)
*G06F 11/07* (2006.01)
*G06K 9/00* (2006.01)
*G06K 9/62* (2006.01)

(52) U.S. Cl.
CPC .............. *G06F 11/079* (2013.01); *G06K 9/00* (2013.01); *G06N 5/047* (2013.01); *G06Q 10/063* (2013.01); *G06Q 10/067* (2013.01); *G06K 9/00677* (2013.01); *G06K 9/6278* (2013.01); *G06K 2009/00738* (2013.01)

(56) References Cited

U.S. PATENT DOCUMENTS

| | | | |
|---|---|---|---|
| 2004/0176864 A1* | 9/2004 | Cocco | G05B 19/4183 700/108 |
| 2005/0283680 A1 | 12/2005 | Kobayashi et al. | |
| 2007/0185586 A1* | 8/2007 | Al-Attar | G05B 13/028 700/1 |
| 2007/0288414 A1* | 12/2007 | Barajas | G06N 7/00 706/46 |
| 2009/0171879 A1* | 7/2009 | Bullen | G06N 7/005 706/47 |
| 2011/0135203 A1* | 6/2011 | Iwamoto | G06K 9/623 382/192 |
| 2012/0005534 A1* | 1/2012 | Li | G06F 11/008 714/26 |
| 2012/0271587 A1 | 10/2012 | Shibuya et al. | |
| 2013/0103656 A1* | 4/2013 | Sanchez Loureda | G06F 17/30129 707/693 |
| 2013/0325787 A1* | 12/2013 | Gerken | G06N 7/005 706/52 |
| 2015/0061860 A1* | 3/2015 | Pariyani | G05B 23/024 340/501 |

FOREIGN PATENT DOCUMENTS

| | | |
|---|---|---|
| JP | 2014-127093 A | 7/2014 |
| WO | 2006003449 A2 | 1/2006 |

OTHER PUBLICATIONS

Noda, Masaru et al. "Operation Analysis of Ethylene Plant . . . " FOCAPO 2012 [Published 2012] [Retrieved Online May 2019] <URL: http://focapo.cheme.cmu.edu/2012/proceedings/data/papers/017.pdf> (Year: 2012).*

Higuchi, Fumitaka et al. "Use of Event Correlation analysis to Reduce Number of Alarms" PSE 2009 [Published 2009] [Retrieved Online May 2019] <URL: https://www.sciencedirect.com/science/article/pii/S1570794609706443> (Year: 2009).*

Weidl, G et al. "Applications of Object-oriented Bayesian network for condition monitoring . . . " Computers and Chemical Engineering vol. 29, Issue 9. [Published 2005] [Retrieved online May 2019] <URL: https://www.sciencedirect.com/science/article/pii/S009813540500133X> (Year: 2005).*

Dalapatu, Pradeep et al. "Alarm Allocation for event-based process alarm systems" IFAC vol. 46 Issue 32 [Published 2013] [ Retrieved Online May 2019] <URL: https://www.sciencedirect.com/science/article/pii/S1474667015383592> (Year: 2013).*

Nishiguchi, Junya et al. "IPL2 and 3 performance improvement method for process safety using event correlation analysis" Comput. and Chem. Engineering vol. 34 Is. 12. [Published 2010] [Retrieved online Oct. 2019] <URL: https://www.sciencedirect.com/science/article/pii/S0098135410002772> (Year: 2010).*

Ahmed, Kabir et al. "Similarity Analysis of Industrial Alarm Flood Data" IEEE TASE vol. 10 No. 2 [Published 2013] [Retrieved online Nov. 2019] <URL: https://ieeexplore.ieee.org/abstract/document/6419854> (Year: 2013).*

Pearl, "Probabilistic Reasoning in Intelligent Systems: Network of Plausible Inference", Baysesian Inference, Chapter 2, Morgran Kaufman, 1988, pp. 29-75.

Suyari, "Introduction to Bayesian Network (1)", Medical Imaging Technology, vol. 21, No. 4, Sep. 2003, 11 total pages.

Communication dated Mar. 29, 2016 issued by European Patent Office in counterpart European Patent Application No. 15194477.4.

* cited by examiner

| DATE AND TIME | DEVICE IDENTIFIER | EVENT IDENTIFIER |
|---|---|---|
| 2014/10/21 18:00:00 | TAG1 | ALARM1 |
| 2014/10/21 18:00:03 | TAG2 | OP1 |
| 2014/10/21 18:00:04 | TAG3 | ALARM2 |
| 2014/10/21 18:00:06 | TAG2 | ALRAM3 |

| DATE AND TIME | TAG1:ALARM1 | TAG2:ALARM3 | TAG2:OP1 | TAG3:ALARM2 | ... |
|---|---|---|---|---|---|
| 2014/10/21 18:00:00 | ○ | | | | ... |
| 2014/10/21 18:00:01 | | | | | ... |
| 2014/10/21 18:00:02 | | | | | ... |
| 2014/10/21 18:00:03 | | | ○ | | ... |
| 2014/10/21 18:00:04 | | | | ○ | ... |
| 2014/10/21 18:00:05 | | | | | ... |
| 2014/10/21 18:00:06 | | ○ | | | ... |

FIG. 7

| EVENT | OCCURRENCE PROBABILITY |
|---|---|
| TAG1:ALARM1 | 5.2% |
| TAG2:ALARM3 | 1.8% |
| TAG2:OP1 | 3.7% |
| TAG3:ALARM2 | 8.4% |

| EVENT PAIR | | SIMULTANEOUS OCCURRENCE PROBABILITY |
|---|---|---|
| TAG1:ALARM1 | TAG2:ALARM3 | 0.41% |
| TAG1:ALARM1 | TAG2:OP1 | 0.58% |
| TAG1:ALARM1 | TAG3:ALARM2 | 0.31% |
| TAG2:ALARM3 | TAG2:OP1 | 0.95% |
| TAG2:ALARM3 | TAG3:ALARM2 | 0.84% |

⋮  ⋮

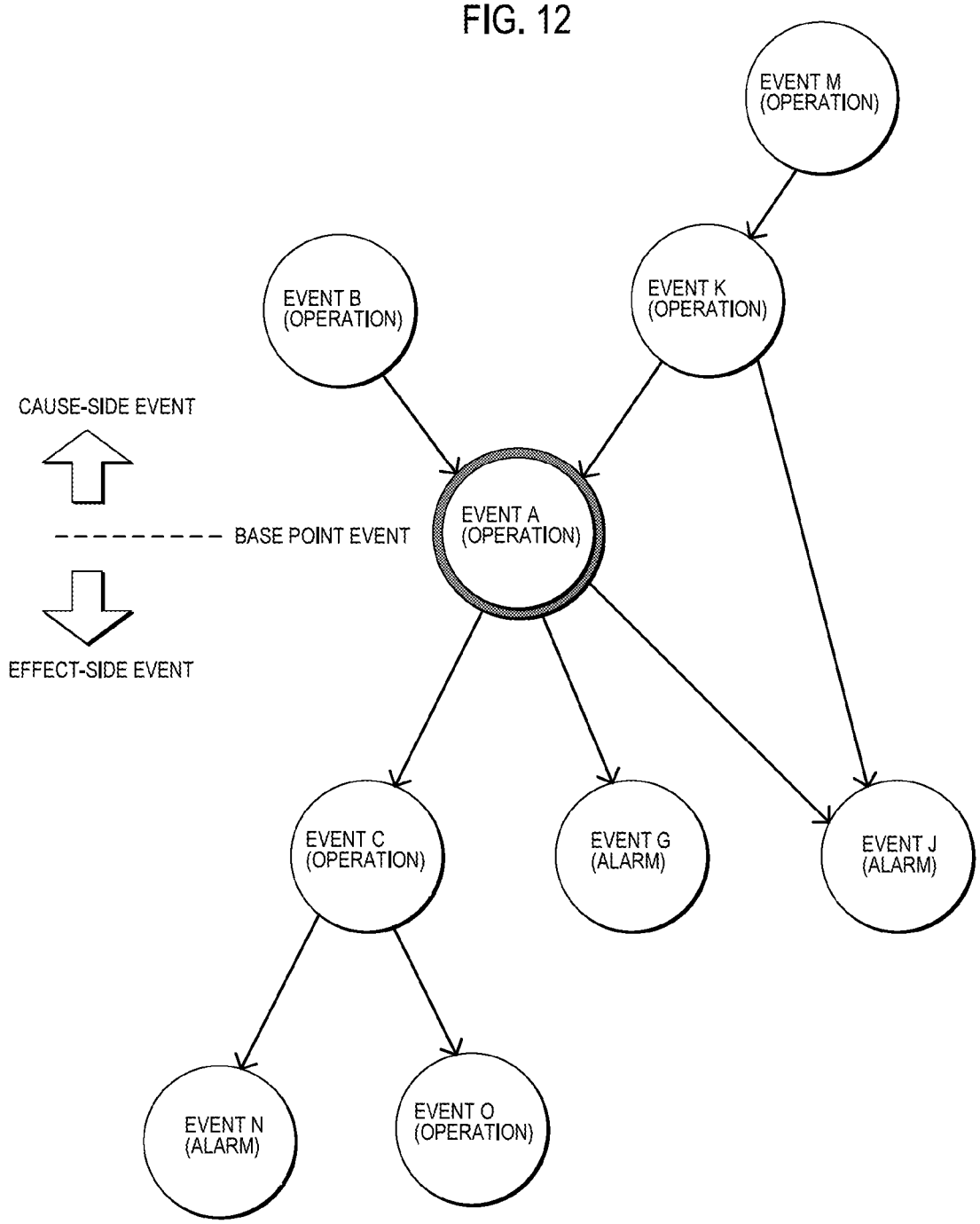

FIG. 14

IMPROVEMENT CANDIDATE PATTERN DEFINITION FORMAT

| item | examples of setting value | probability conditions |
|---|---|---|
| 1) base point event | • alarm<br>• operation | |
| 2) associated event | • only alarm<br>• only alarm or nothing<br>• only operation<br>• only operation or nothing<br>• combination of alarm and operation<br>• combination of alarm and operation or nothing<br>• nothing<br>• without condition | |
| 3) cause-side event | the same as above | • P(base point \| cause) is equal to or greater than reference value<br>• P(cause \| base point) is equal to or greater than reference value<br>• both are high<br>• without condition |
| 4) effect-side event | the same as above | • P(cause \| base point) is equal to or greater than reference value<br>• P(base point \| cause) is equal to or greater than reference value<br>• both are high<br>• without condition |

FIG. 15A

EXAMPLE OF IMPROVEMENT CANDIDATE PATTERN: ALARM CORRESPONDENCE OPERATION

| item | examples of setting value | probability conditions |
|---|---|---|
| 1) base point event | • operation | |
| 2) associated event | • without condition | |
| 3) cause-side event | • only alarm | • P(cause \| base point) is equal to or greater than reference value |
| 4) effect-side event | • without condition | • without condition |

FIG. 15B

EXAMPLE OF CORRESPONDING BAYESIAN NETWORK

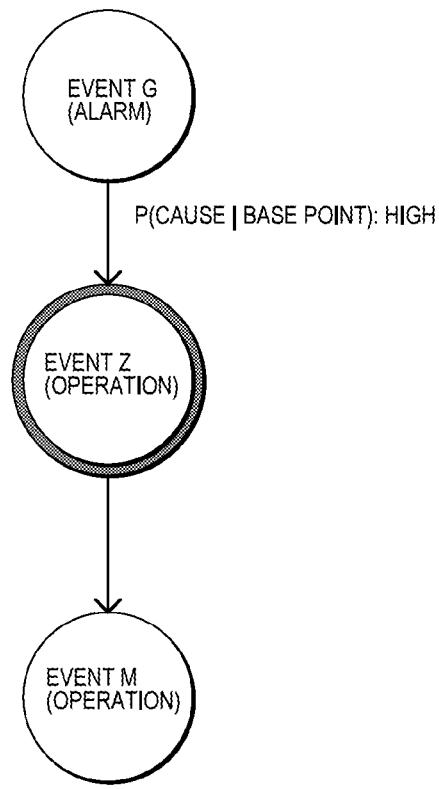

FIG. 16A

EXAMPLE OF IMPROVEMENT CANDIDATE PATTERN: NEGLECTED ALARM

| item | examples of setting value | probability conditions |
|---|---|---|
| 1) base point event | - alarm | |
| 2) associated event | - only alarm or nothing | |
| 3) cause-side event | - without condition | - without condition |
| 4) effect-side event | - without condition | - without condition |

FIG. 16B

EXAMPLE OF CORRESPONDING BAYESIAN NETWORK

FIG. 16C

EXAMPLE OF CORRESPONDING BAYESIAN NETWORK

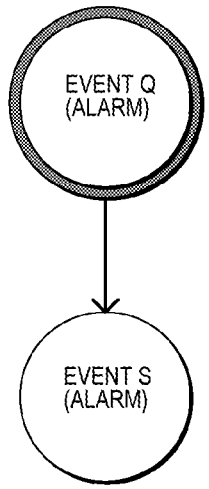

EXAMPLE OF IMPROVEMENT CANDIDATE PATTERN: CHAIN ALARM

| item | examples of setting value | probability conditions |
|---|---|---|
| 1) base point event | • alarm | |
| 2) associated event | • only alarm | |
| 3) cause-side event | • only alarm or nothing | • both are high |
| 4) effect-side event | • only alarm or nothing | • both are high |

EXAMPLE OF CORRESPONDING BAYESIAN NETWORK

FIG. 18A
| | ALARM CORRESPONDENCE OPERATION | CHAIN ALARM | NEGLECTED ALARM | |
|---|---|---|---|---|
| EVENT | DISPLAY TARGET | FREQUENCY | NUMBER OF ASSOCIATED EVENTS |
| ▶ Event a | ☐ | 31988 | 2 |
| ▶ Event b | ☑ | 31254 | 2 |
| ▶ Event c | ☐ | 32462 | 2 |
| Event d | ☐ | 2235 | 0 |
| ▶ Event e | ☐ | 1815 | 85 |
| ▶ Event f | ☐ | 1379 | 86 |
CAUSE-AND-EFFECT RELATIONSHIP DIAGRAM DISPLAY
FIG. 18B
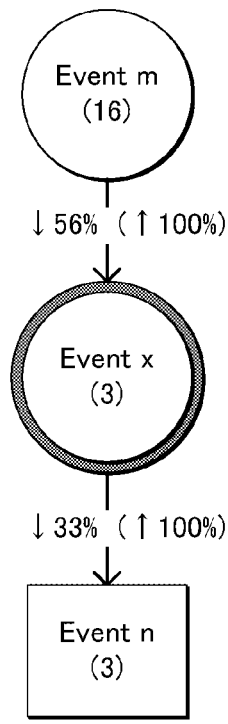
FIG. 18C
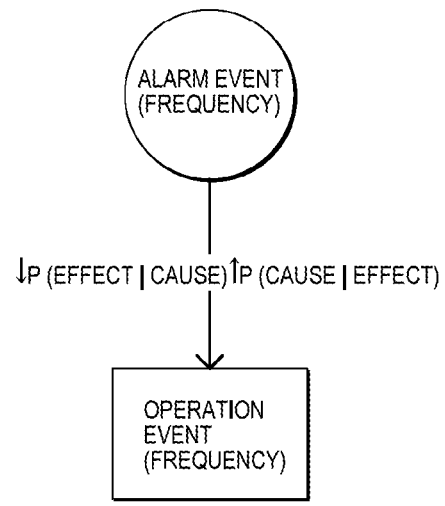

EVENT ANALYSIS APPARATUS, EVENT ANALYSIS METHOD AND COMPUTER PROGRAM PRODUCT

CROSS-REFERENCE TO RELATED APPLICATION

The present application claims priority from Japanese Patent Application No. 2014-238695 filed on Nov. 26, 2014, the entire content of which is incorporated herein by reference.

BACKGROUND

Technical Field

The present disclosure relates to an event analysis apparatus, an event analysis method and a computer program product configured to analyze a cause-and-effect relationship of an event such as an alarm generated in a plant, an operator's operation and the like and to extract an improvement candidate.

Related Art

In a distributed control system configured to control a field device group such as a sensor, an actuator and the like by using a control system such as field controllers distributed and arranged in a plant, an event analysis apparatus configured to acquire and analyze events such as an alarm generated in the plant, an operator's operation and the like has been known.

In the event analysis apparatus, the number and a frequency of occurrences of each event are statistically treated, and a person in charge of operation, an operation consultant and the like of the plant acquire the information about the alarm frequently generated, the operation frequently performed and the like and perceive an entire tendency of the events to improve the operation and the safety of the plant by using the event analysis apparatus.

In recent years, a method of analyzing not only an individual event but also a relation among a plurality of different events has been suggested. For example, Patent Document 1 discloses a related art method of calculating an individual occurrence probability of each event and a simultaneous occurrence probability for each combination of the events from collected event logs, and establishing a Bayesian network on the basis of an obtained conditional probability.

Here, the Bayesian network is one of graphical models describing a cause-and-effect relationship by the probability, and is a probabilistic reasoning model representing reasoning of the complex cause-and-effect relationship by a directed graph structure and representing a relation between respective variables by a conditional probability.

FIG. 19 is an example of the Bayesian network depicting causal characteristics of events E1, E2, E3. As shown in FIG. 19, in the Bayesian network, the respective events are represented by nodes, and the nodes are connected each other by a unidirectional arrow. In the Bayesian network, a probability is assigned to each node, and a conditional probability of a node becoming an end point of the arrow in relation to a parent node is assigned to the node becoming the end point of the arrow.

In the example of FIG. 19, an occurrence probability of the event E1 is 0.1%, and an occurrence probability of the event E2 is 0.2%. Also, a conditional probability is assigned to the event E3 becoming an end point of the arrow, and when both the event E1 and the event E2 occur, an occurrence probability of the event E3 is 95%.

In this example, focusing on the event E1, the event E3, which is an end point of the arrow, is an effect-side event, and focusing on the event E3, the event E1 and the event E2, which are base points of the arrows, are cause-side events.

From the Bayesian network, it is possible to obtain not only the probability that the effect-side event E3 will occur when the cause-side event E1 occurs but also the probability that the cause-side event E1 has occurred when the effect-side event E3 occurred.

According to the event analysis apparatus disclosed in Patent Document 1, when a user designates an event to be focused, an event relating to the designated event is extracted on the basis of the event log, so that the Bayesian network is established and a cause-and-effect relationship with the related event is probabilistically displayed.

Thereby, the user can perceive the cause-and-effect relationship of the event to be focused and perform improvements on an operation sequence and an alarm setting, as required. For example, for alarm groups in which the cause-and-effect relationship highly occurs like a chain reaction, it is possible to reduce the number of times of alarm occurrence by integrally treating the alarm groups. Also, when there is a specific operation of which a cause is an occurrence of any alarm, it is possible to automate an alarm correspondence operation, for example.

[Patent Document 1] Japanese Patent Application Publication No. 2014-127093A

[Non-Patent Document 1] J. Pearl "Probabilistic Reasoning in Intelligent Systems: Networks of Plausible Inference" Morgran Kaufman 1988, Chapter 2 BAYSESIAN INFERENCE

[Non-Patent Document 2] Hiroki Suyari the Bayesian network guide (1) MEDICAL IMAGING TECHNOLOGY Vol. 21 No. 4 Sep. 2003, p 315-318

As described above, it is possible to perceive the cause-and-effect relationship of the event to be focused and to perform improvements on an operation sequence and an alarm setting, as required, by using the event analysis apparatus disclosed in Patent Document 1.

According to the event analysis apparatus disclosed in Patent Document 1, the user designates the event to be focused. For this reason, when an event of an improvement target is determined in advance, it is possible to immediately determine whether an improvement is required by perceiving the cause-and-effect relationship of the event.

However, when an improvement target is not determined and it is required to find out an event of an improvement candidate in the plant, it is necessary to perceive the cause-and-effect relationship of each event and to determine whether an improvement is required. Therefore, the labor and time are required to extract the improvement candidate.

SUMMARY

Exemplary embodiments of the invention provides an event analysis apparatus, an event analysis method and a computer program product which support an operation of extracting an event of an improvement candidate on the basis of a cause-and-effect relationship of an event occurring in a plant.

An event analysis apparatus configured to analyze events that occur in a plant, according to an exemplary embodiment of the invention, the apparatus comprises:

an associated event group preparation unit configured to calculate a degree of association between the events on the basis of an event matrix, which represents presence and absence of occurrence of each event including an attribute indicating an alarm or an operation in time series, and to prepare an associated event group for each event, in which a specific event is set as a base point event and the base point event and an event having a high degree of association are grouped;

a cause-and-effect relationship model establishment unit configured to establish a probabilistic cause-and-effect relationship model by a Bayesian network on the basis of the event matrix, for each associated event group;

an improvement candidate pattern receiving unit configured to receive a setting of an improvement candidate pattern in which a condition of an event to be set as an improvement candidate is determined by attributes of the base point event and the associated event and a conditional probability between the base point event and the associated event, and a pattern analysis unit configured to extract a probabilistic cause-and-effect relationship model conforming to any one of the set improvement candidate patterns, from the established probabilistic cause-and-effect relationship models for each event.

The associated event group preparation unit may be configured to divide the event matrix into blocks having a predetermined reference time width, to calculate an individual occurrence probability of the events and a simultaneous occurrence probability between the events, on the basis of presence and absence of occurrence of each event in each block, and to use a mutual information amount, which is to be obtained from the individual occurrence probability and the simultaneous occurrence probability, as the degree of association between the events.

The improvement candidate pattern may be a pattern in which the associated event is distinguished into a cause-side event and an effect-side event in relation to the base point event, and an attribute and a condition of a conditional probability may be determined for each of the cause-side event and the effect-side event.

The improvement candidate pattern may be set a condition that there is no associated event.

The improvement candidate pattern may be set that a condition is not set for an associated event.

An event analysis method of analyzing events occurring in a plant, according to an exemplary embodiment of the invention, the method comprises:

calculating a degree of association between the events on the basis of an event matrix, which represents presence and absence of occurrence of each event including an attribute indicating an alarm or an operation in time series, and preparing an associated event group for each event, in which a specific event is set as a base point event and the base point event and an event having a high degree of association are grouped;

establishing a probabilistic cause-and-effect relationship model by a Bayesian network on the basis of the event matrix, for each associated event group;

receiving a setting of an improvement candidate pattern in which a condition of an event to be set as an improvement candidate is determined by attributes of the base point event and the associated event and a conditional probability between the base point event and the associated event, and extracting a probabilistic cause-and-effect relationship model conforming to any one of the set improvement candidate patterns, from the established probabilistic cause-and-effect relationship models for each event.

A computer program for enabling an event analysis apparatus configured to analyze events occurring in a plant to function as an information processing apparatus, according to an exemplary embodiment of the invention, the computer program is further configured to enable the information processing apparatus to function as:

an associated event group preparation unit configured to calculate a degree of association between the events on the basis of an event matrix, which represents presence and absence of occurrence of each event including an attribute indicating an alarm or an operation in time series, and to prepare an associated event group for each event, in which a specific event is set as a base point event and the base point event and an event having a high degree of association are grouped;

a cause-and-effect relationship model establishment unit configured to establish a probabilistic cause-and-effect relationship model by a Bayesian network on the basis of the event matrix, for each associated event group;

an improvement candidate pattern receiving unit configured to receive a setting of an improvement candidate pattern in which a condition of an event to be set as an improvement candidate is determined by attributes of the base point event and the associated event and a conditional probability between the base point event and the associated event, and a pattern analysis unit configured to extract a probabilistic cause-and-effect relationship model conforming to any one of the set improvement candidate patterns, from the established probabilistic cause-and-effect relationship models for each event.

A computer program product, according to an exemplary embodiment of the invention, comprises: a non-transitory computer-readable medium comprising code for causing an information processing apparatus to:

calculate a degree of association between the events on the basis of an event matrix, which represents presence and absence of occurrence of each event including an attribute indicating an alarm or an operation in time series, and to prepare an associated event group for each event, in which a specific event is set as a base point event and the base point event and an event having a high degree of association are grouped;

establish a probabilistic cause-and-effect relationship model by a Bayesian network on the basis of the event matrix, for each associated event group;

receive a setting of an improvement candidate pattern in which a condition of an event to be set as an improvement candidate is determined by attributes of the base point event and the associated event and a conditional probability between the base point event and the associated event; and extract a probabilistic cause-and-effect relationship model conforming to any one of the set improvement candidate patterns, from the established probabilistic cause-and-effect relationship models for each event.

According to the exemplary embodiment of the present invention, it is possible to support the operation of extracting the event of the improvement candidate on the basis of the cause-and-effect relationship of the event occurring in the plant.

BRIEF DESCRIPTION OF THE DRAWINGS

FIG. 7 shows an example of an individual occurrence probability of each event.

FIG. 8 shows an example of a simultaneous probability for each event pair.

FIG. 12 shows an example of the Bayesian network of an associated event group in which an event A is a base point event.

FIG. 14 shows an example of a definition format of an improvement candidate pattern.

FIG. 15A shows an improvement candidate pattern corresponding to an alarm correspondence operation.

FIG. 15B shows an example of the Bayesian network conforming to an improvement candidate pattern shown in FIG. 15A.

FIG. 16A shows an improvement candidate pattern corresponding to a neglected alarm.

FIGS. 16B and 16C show examples of the Bayesian network conforming to an improvement candidate pattern shown in FIG. 16A.

FIGS. 18A to 18C show an example of an analysis result display.

DETAILED DESCRIPTION

Figure 1:
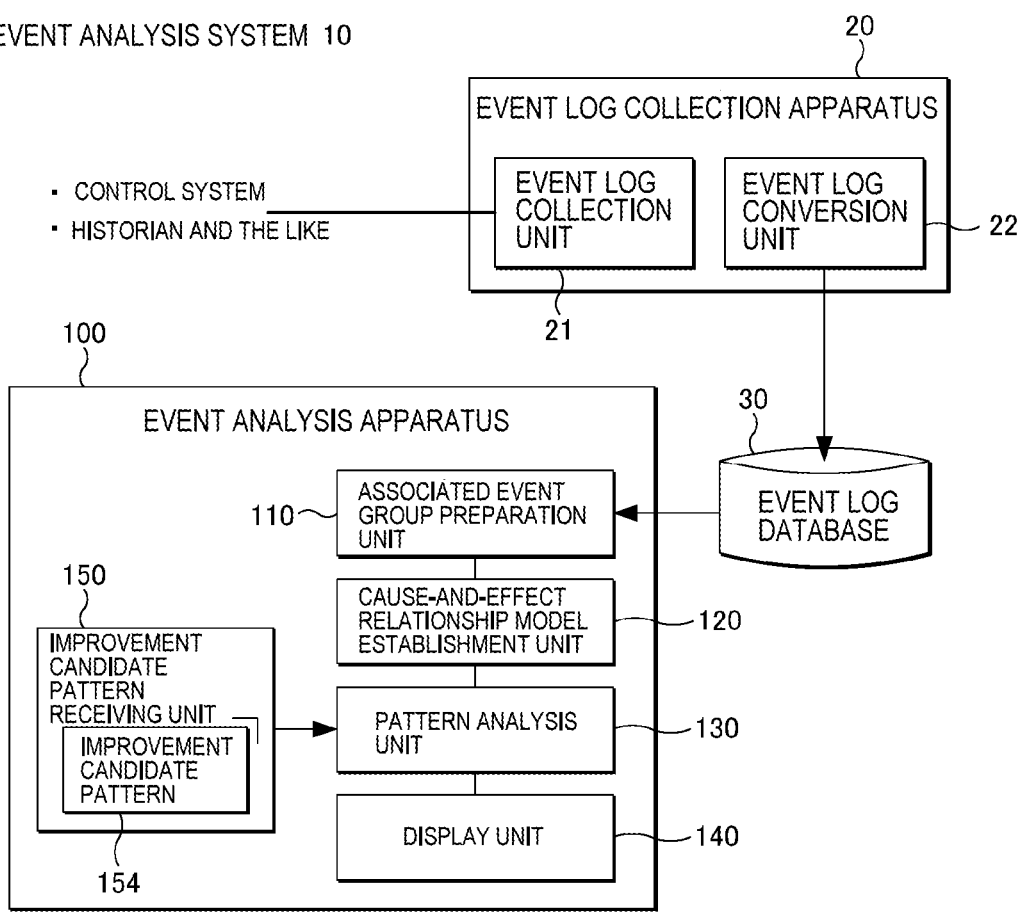
FIG. 1 is a block diagram showing a configuration of an event analysis system according to an exemplary embodiment of the present invention.

An exemplary embodiment of the present invention will be described with reference to the drawings. FIG. 1 is a block diagram showing a configuration of an event analysis system 10 according to an exemplary embodiment of the present invention. As shown, the event analysis system 10 includes an event log collection apparatus 20, an event log database 30, and an event analysis apparatus 100. The event analysis system 10 may be configured by a plurality of devices or one device.

The event log collection apparatus 20 has an event log collection unit 21 and an event log conversion unit 22. The event log collection unit 21 is configured to collect an event log from a control system and a historian being operating in a plant. The event log includes a date and time at which an event occurred, an identifier (tag) of a device in which an event occurred, an identifier of an event type, and the like. The event type is distinguished into 'operation' and 'alarm' as regards a category of the event. However, the category to be distinguished is not limited to 'operation' and 'alarm'.

The event log conversion unit 22 is configured to record the event log collected by the event log collection unit 21 to the event log database 30. The event log conversion unit 22 converts the event log into a format, which is appropriate to an analysis to be performed by the event analysis apparatus 100, when recording the event log.

Specifically, the event log conversion unit 22 prepares a matrix in which a time axis of a minimum time unit of an event log is set in a vertical direction and items having combined an identifier of a device and an identifier of an event type are arranged in a horizontal direction. Then, the event log conversion unit 22 converts an event included in the event log into a format in which a check is input to a column corresponding to a date and time at which the event occurred, and a device in which the event occurred and an event type.

Hereinafter, data obtained by converting the event log is referred to as 'event matrix', and a combination of a device and an event type is referred to as 'event'. For example, 'ALARM1' occurring in a device 'TAG1' is denoted as an event 'TAG1: ALARM1'. That is, even when the event type is the same, if the devices in which the event occurred are different, the events are treated as separate events.

The event analysis apparatus 100 has an associated event group preparation unit 110, a cause-and-effect relationship model establishment unit 120, a pattern analysis unit 130, a display unit 140, and an improvement candidate pattern receiving unit 150.

In the meantime, the event analysis apparatus 100 may be configured using a versatile information processing apparatus such as a personal computer and a server computer. That is, the information processing apparatus may function as the event analysis apparatus 100 by executing a computer program for performing processing that will be described later. The event analysis apparatus 100 may also be configured as a dedicated apparatus.

The associated event group preparation unit 110 is configured to calculate a degree of association between events on the basis of the event matrix and to prepare an associated event group for each event. Here, the associated event group is a group in which a base point event and an event having a high degree of association with the base point event are grouped.

The cause-and-effect relationship model establishment unit 120 is configured to establish a probabilistic cause-and-effect relationship model by the Bayesian network on the basis of the event matrix for each associated event group.

The improvement candidate pattern receiving unit 150 is configured to receive a setting of an improvement candidate pattern 154 from a user. Here, the improvement candidate pattern 154 is a pattern in which a condition of an event, which is to be an improvement candidate, is determined by attributes of the base point event and the associated event and a conditional probability between the base point event and the associated event.

The pattern analysis unit 130 is configured to extract a probabilistic cause-and-effect relationship model, which matches one of the set improvement candidate patterns, from the probabilistic cause-and-effect relationship model established for each event.

The display unit 140 is configured to perform a display control of an analysis result of the pattern analysis unit 130, an operation menu and the like, and to output display image data to an embedded or externally connected display apparatus.

Subsequently, operations of the event analysis system 10 are described. First, operations of the event log collection apparatus 20 are described with reference to a flowchart of FIG. 2. When a predetermined collection timing is reached (S11: Yes), the event log collection unit 21 collects an event log from the control system, the historian and the like (S12).

Figures 2, 3:
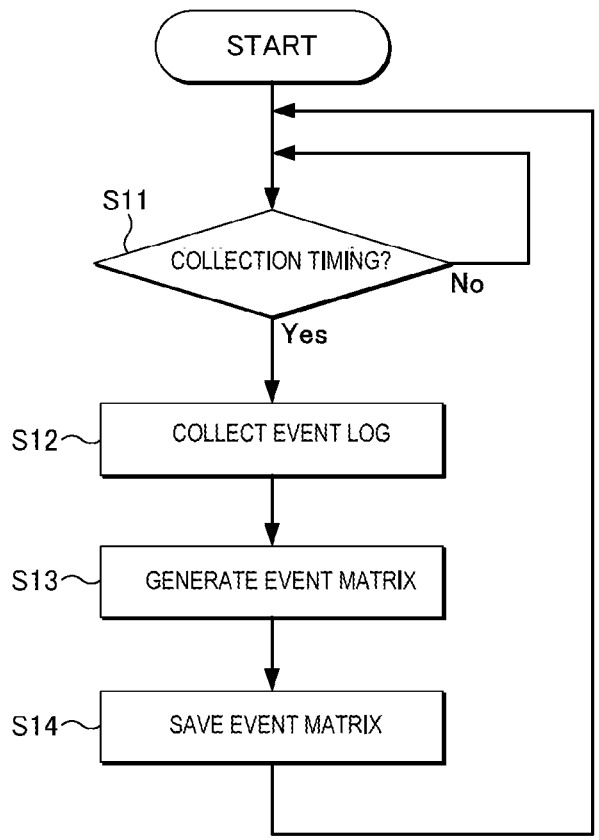
FIG. 2 is a flowchart showing operations of an event log collection apparatus.
FIG. 3 shows an example of an event log.

As shown in an example of FIG. 3, the event log includes a date and time at which the event occurred, the device identifier (tag), the event identifier. In the example of FIG. 3, an alarm 'ALARM 1' occurred in a device 'TAG1' on 2014/10/21 18:00:00, and an operation 'OP1' was performed in a device 'TAG2' on 2014/10/21 18:00:03, for example. The timing at which the event log is to be collected may be designated on the basis of a predetermined cycle, an instruction from the user, a predetermined trigger and the like, and is preset.

When the event log is collected, the event log conversion unit 22 prepares the event matrix on the basis of the event log (S13). As described above, the event matrix is a matrix in which a time axis of a minimum time unit of an event log is set in a vertical direction and events are arranged in a horizontal direction and in which for an event included in the event log, a check is input to a column corresponding to a date and time at which the event occurred, and a device in which the event occurred and an event type.

Figures 4, 5:
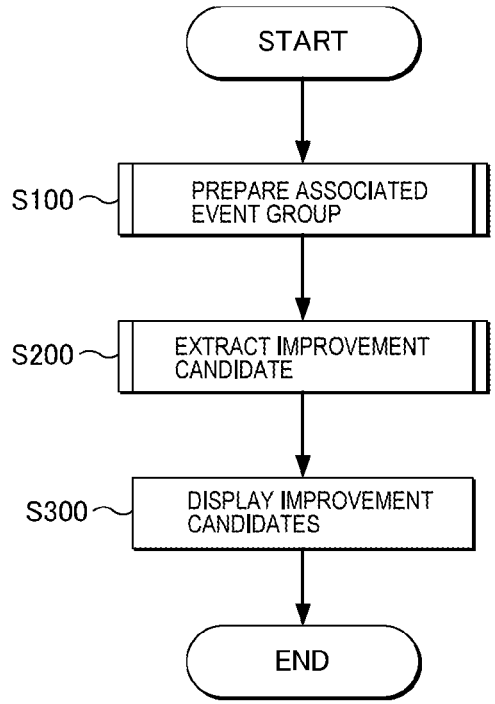
FIG. 4 shows an example of an event matrix.
FIG. 5 is a flowchart showing operations of the event analysis apparatus.

FIG. 4 shows an event matrix obtained by converting the event log shown in FIG. 3. Here, since the minimum time unit of the event log is one second, a time interval of the event matrix in the vertical direction is one second. Also, since the events having combined the identifier of the device and the identifier of the event type are arranged in the horizontal direction, columns such as 'TAG1: ALRM1' 'TAG2: ALARM3' and 'TAG2: OP1' are generated. Actually, columns for all combinations of the devices and the event types are prepared in the horizontal direction.

In the example, since the alarm 'ALARM1' occurred in the device 'TAG1' on 2014/10/21 18:00:00, the corresponding column is input with the check ('o'). Likewise, since the operation 'OP1' was performed in the device 'TAG2' on 2014/10/21 18:00:03, the corresponding column is input with the check.

When the event matrix is prepared, the event log conversion unit 22 records the prepared event matrix to the event log database 30 (S14). At this time, it is preferably to additionally record the event matrix so that the past data can also be used. Then, the event log collection unit 21 waits for the next collection timing (S11).

Next, operations of the event analysis apparatus 100 are described with reference to a flowchart of FIG. 5. The operations start when the user inputs an event analysis instruction to the event analysis apparatus 100, for example.

As shown in FIG. 5, in the event analysis apparatus 100, a series of operations of preparing the associated event groups (S100), extracting improvement candidates (S200), and displaying the extracted improvement candidates (S300) are performed.

Figure 6:
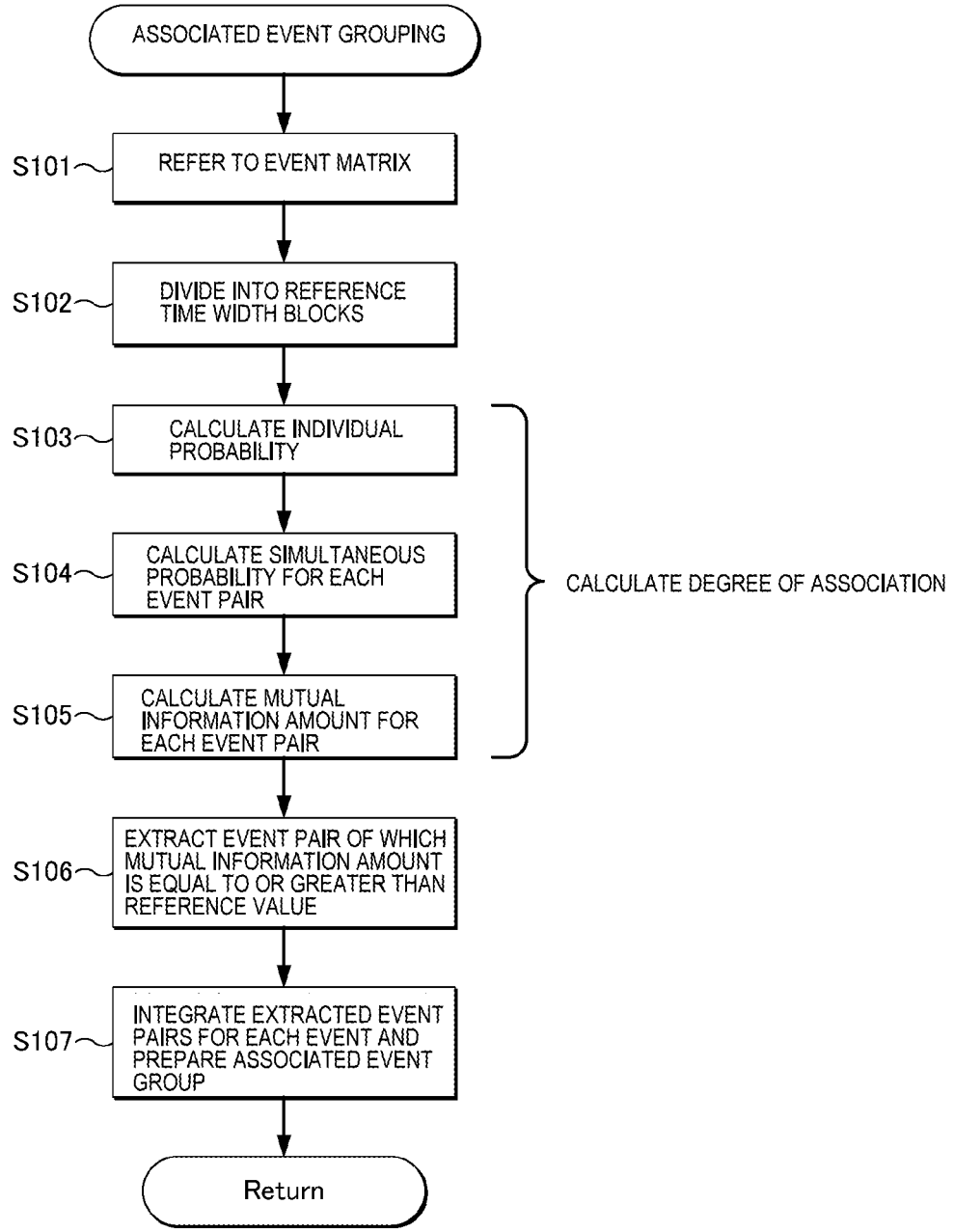
FIG. 6 is a flowchart showing associated event group preparation processing.

First, the associated event group preparation processing (S100) is described with reference to a flowchart of FIG. 6. The associated event group is prepared by preparing an event pair having two events as one set for all combinations, calculating a degree of association of each event pair, and grouping the event pairs having a high degree of association.

Since the Bayesian network is established on the basis of the probability, the degree of association based on the probability is used to prepare the associated event group. As the degree of association based on the probability, a mutual information amount, an information amount reference and the like may be exemplified. Although all can be used in the present invention, a case where the mutual information amount is used as the degree of association is described in the below.

In the meantime, the mutual information amount I(X, Y) of an event X and an event Y is defined by equation 1 in which an occurrence probability of the event X is denoted as p(x), an occurrence probability of the event Y is denoted as p(y), and a simultaneous occurrence probability of the event X and the event Y is denoted as p(x, y).

$$I(X, Y) = \sum_{x,y} p(x, y) \log \frac{p(x, y)}{p(x)p(y)} \quad \text{[equation 1]}$$

That is, when calculating the mutual information amount, the individual occurrence probability of each event and the simultaneous occurrence probability of the events are required. In this exemplary embodiment, in order to calculate the probabilities, an arbitrary time width, for example, 10 minutes or one hour is defined as a reference time width. That is, the occurrence probability represents a probability that an event will occur within the reference time As shown in the flowchart of FIG. 6, the associated event group preparation unit 110 refers to the latest event matrix recorded in the event log database 30 (S101). Then, the associated event group preparation unit 110 divides a range from the start to the end of the time axis of the event matrix into a plurality of blocks having the reference time width (S102).

In the meantime, the reference time width can be determined depending on a plant of an analysis target. For example, when analyzing a plant based on a device having no delay element such as a flow rate and a pressure, the reference time width is preferably set to be short. On the other hand, when analyzing a plant based on a device having a primary delay element such as a temperature, the reference time width is preferably set to be long.

Also, when a variety of devices exist in the plant, a plurality of reference time widths may be set, rather than the single reference time width, and the degree of association may be calculated in accordance with each time width. In order to easily perform the corresponding processing, the time axis is set in the minimum time unit of the event log in the event matrix.

The associated event group preparation unit 110 determines an event of a processing target, determines whether the target event has occurred at least once for each block, and counts the number of blocks in which the event has occurred. By dividing the count value by the number of blocks over the entire time period, it is possible to calculate an occurrence probability relating to the target event. By performing the corresponding processing for all the events, it is possible to calculate the individual occurrence probability of each event as shown in FIG. 7 (S103).

Then, the associated event group preparation unit 110 combines two events to prepare an event pair and counts the number of blocks in which both the events have occurred. By dividing the count value by the number of blocks over the entire time period, it is possible to calculate a simultaneous probability relating to the target event pair. By performing the corresponding processing for all the event pairs, it is possible to calculate the simultaneous occurrence probability of each event pair as shown in FIG. 8 (S104).

Then, the associated event group preparation unit 110 calculates a mutual information amount for each event pair from the individual occurrence probability of the events and the simultaneous occurrence probability of the event pair (S105). The mutual information amount can be calculated on the basis of the equation 1.

Figure 9:
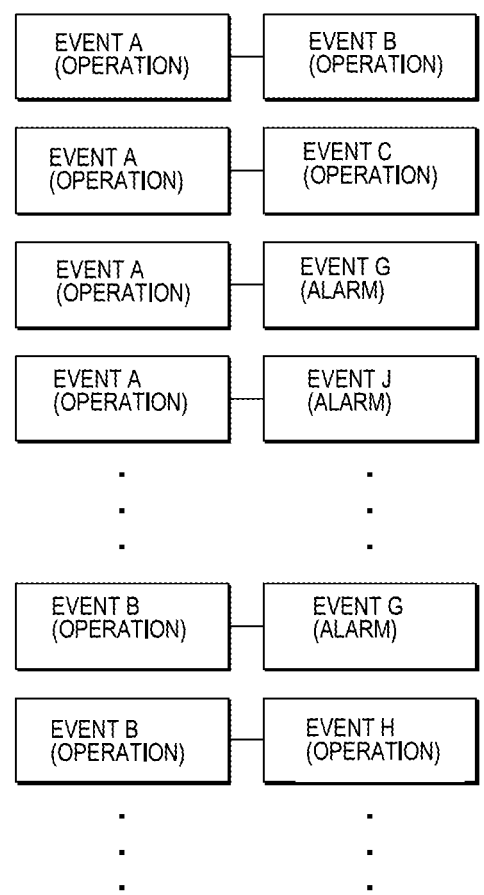
FIG. 9 shows an example of an extracted event pair.

From all the event pairs, the associated event group preparation unit 110 extracts an event pair of which the calculated mutual information amount is equal to or greater than a predetermined reference value (S106). The extracted event pair is an event pair that is considered to have the strong relativity between the events. FIG. 9 shows an example of the extracted event pair. In the example of FIG. 9, an event pair of an event A and an event B, an event pair of an event A and an event C, and the like are extracted.

Finally, the associated event group preparation unit 110 integrates the extracted event pairs for each event to prepare an associated event group (S107). The associated event group preparation unit 110 prepares the associated event group for each event. For example, as shown in FIG. 10, regarding the event A, the associated event group preparation unit 110 combines the event A and events of the pair targets of the event A for the event pairs, which includes the event A, of the extracted event pairs, and sets an associated event group of the event A.

Here, the event A is referred to as a base point event and the other events are referred to as associated events. This also applies to the event B and events thereafter. For example, when the event pair of the event A and the event B is extracted, the event B is included in the associated events of the associated event group having the event A as the base point event, and the event A is included in the associated events of the associated event group having the event B as the base point event.

Figure 10:
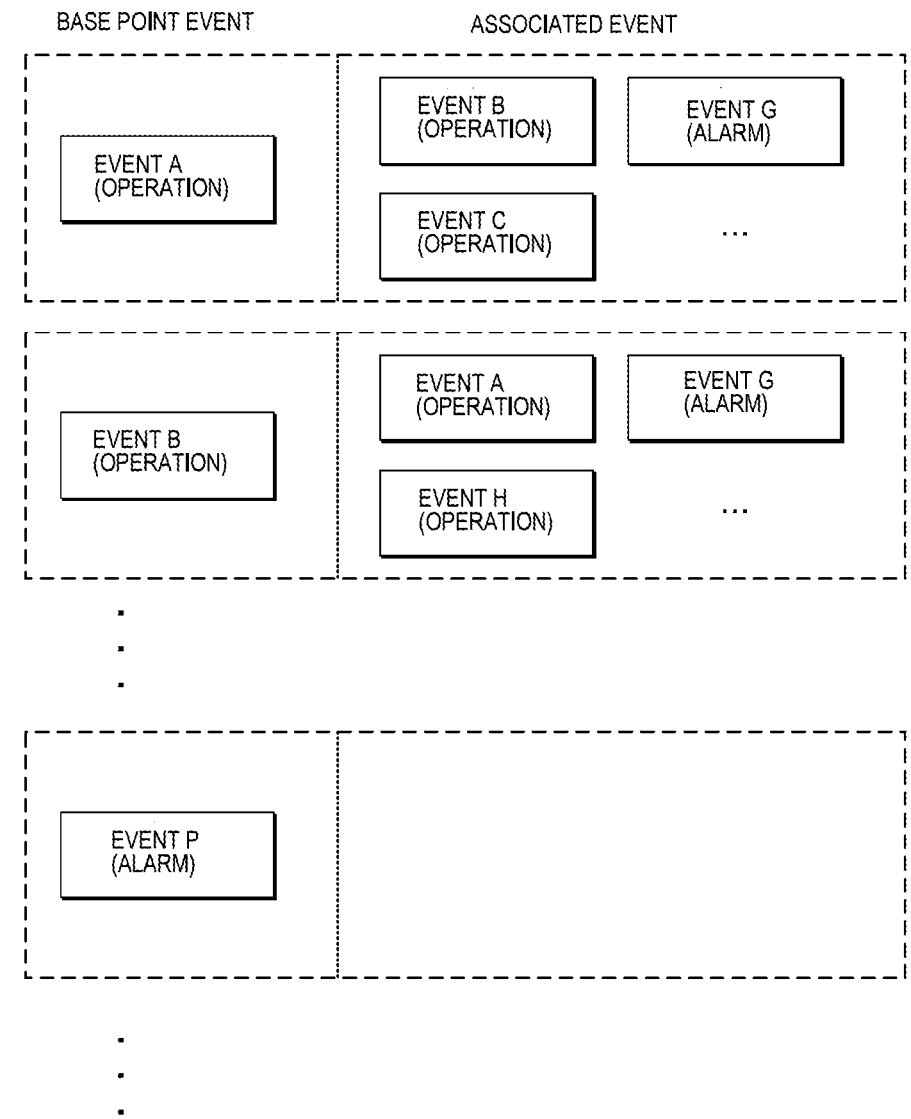
FIG. 10 shows an example of the prepared associated event group.

In the example of FIG. 10, in an associated event group where the event A is the base point event, the event B, the event C, the event G and the like are included as the associated events, and in an associated event group where the event B is the base point event, the event A, the event H, the event G and the like are included as the associated events. Also, there may be an associated event group where there is no associated event, like an event P.

Subsequently, the improvement candidate extraction processing (FIG. 5: S200) is described with reference to a flowchart of FIG. 11. In the improvement candidate extraction processing (S200), the improvement candidate pattern receiving unit 150 receives a setting of the improvement candidate pattern 154 from the user (S201). Meanwhile, the improvement candidate extraction processing may be executed prior to the associated event group preparation processing (S100).

As described above, the improvement candidate pattern 154 is a pattern in which a condition of an event, which is an improvement candidate, is determined by attributes of the base point event and the associated event and a conditional probability between the base point event and the associated event. The improvement candidate pattern 154 may be set in plural. The improvement candidate pattern 154 will be described in detail later.

In the associated event group preparation processing (S100), the associated event groups in which each event is set as the base point event are prepared. From the associated event groups, an associated event group of a processing target is set (S202). The associated event groups may be set in arbitrary order.

The cause-and-effect relationship model establishment unit 120 establishes a cause-and-effect relationship model, i.e., the Bayesian network for the associated event group of a processing target (S203). The Bayesian network may be established using the method of the related art.

For example, like the processing S101 to S104, the cause-and-effect relationship model establishment unit 120 calculates an individual probability of each event and a simultaneous occurrence probability of each event pair, based on the event matrix. Then, based on the calculated probabilities, it is possible to calculate a conditional probability between the respective events, thereby establish the Bayesian network. Here, the conditional probability is a probability that the event B will occur when the event A has occurred, and can be calculated from the individual occurrence probabilities of the event A and the event B and the simultaneous occurrence probability of the event A and the event B by the Bayes' theorem.

The associated event, which is an event having a high degree of association with the base point event, can be distinguished into a cause-side event in relation to the base point event and an effect-side event in relation to the base point event by a direction of an arrow for the base point event.

FIG. 12 shows an example of the Bayesian network of the associated event group in which the event A is the base point event. In the example of FIG. 12, the event B, the event M and the event K are distinguished as the cause-side events, and the event C, the event N, the event O, the event G and the event J are distinguished as the effect-side events. Like the event M, the event N and the event O, another associated event may be interposed between the corresponding event and the base point event.

Figure 13A:
FIGS. 13A and 13B show other examples of the Bayesian network.

Also, as shown in FIG. 13A, a Bayesian network having no associated event may be generated only with the base point event. Since each event has an attribute indicating the operation or the alarm, a Bayesian network where the associated events of the cause-side event are all the alarm and the associated events of the effect-side event are all the operation may be generated, as shown in FIG. 13B.

Figure 13B:
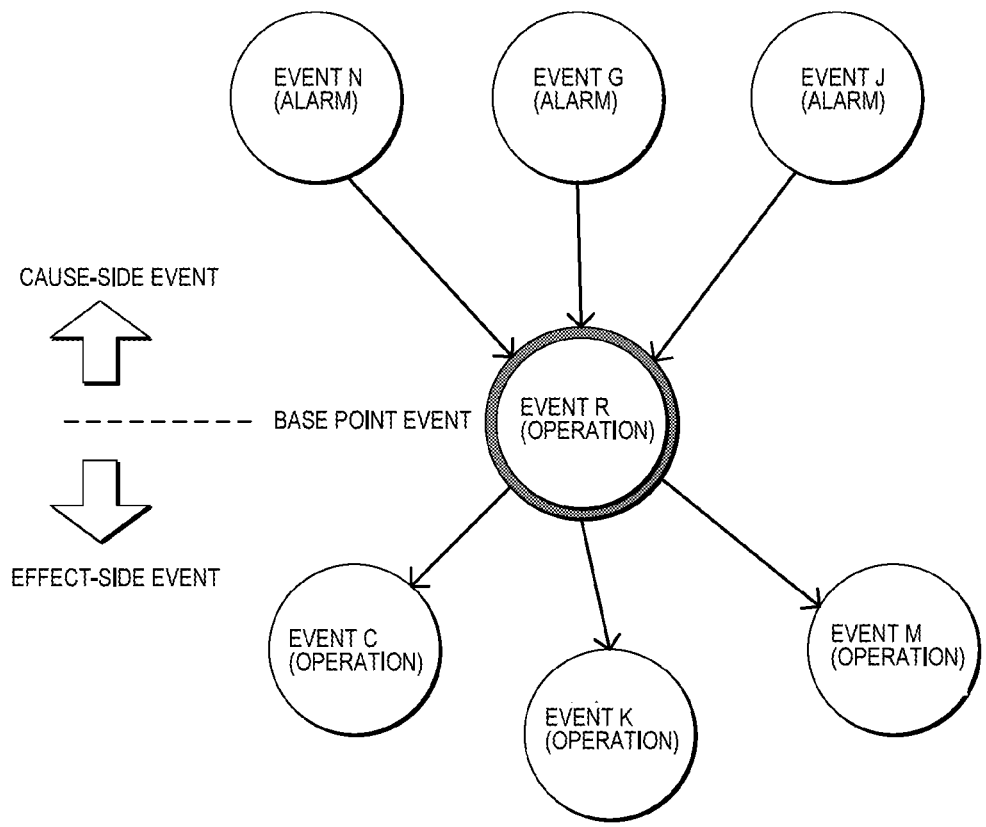

Although not shown in FIGS. 12 and 13A, 13B, each arrow is assigned with the information about the conditional probability. For example, in FIG. 12, a probability that the event A will occur when the event B has occurred, a probability that the event B has occurred when the event A occurred may be exemplified.

Figure 11:
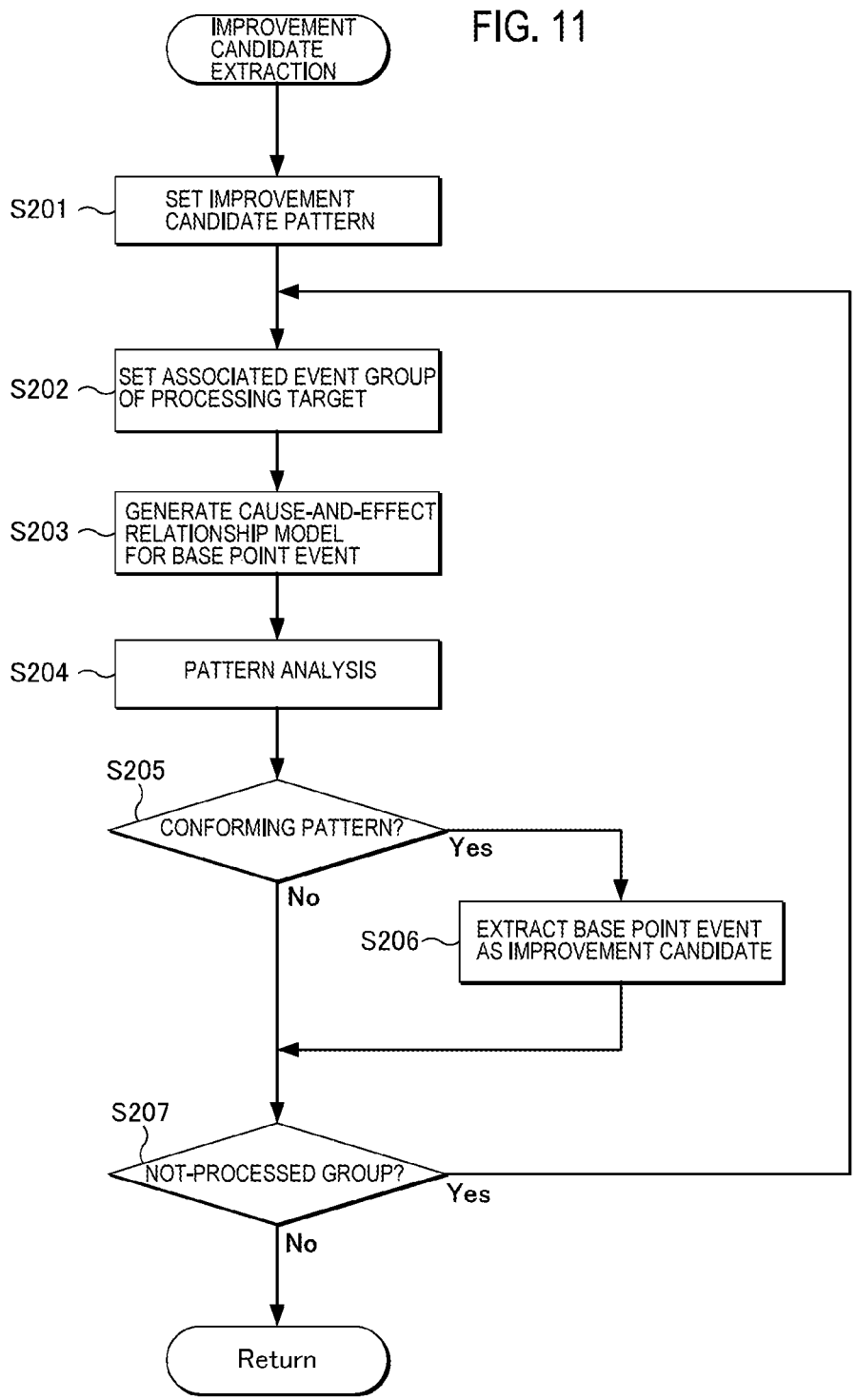
FIG. 11 is a flowchart showing improvement candidate selection processing.

Then, the pattern analysis unit 130 analyzes whether the prepared Bayesian network conforms to one of the improvement candidate patterns 154 set in the processing (S201) (FIG. 11: S204).

Here, the improvement candidate pattern 154 is described. FIG. 14 shows an example of a definition format of the improvement candidate pattern 154. As shown, the improvement candidate pattern 154 defines extraction conditions in which 1) the base point event, 2) the associated event, 3) the cause-side event, and 4) the effect-side event are set as items. However, the extraction conditions may be defined using the other items.

When an associated event group of the Bayesian network satisfying the extraction conditions defined in the improvement candidate pattern 154 conforms to the improvement candidate pattern 154, the corresponding associated event group is extracted as the improvement candidate.

1) The base point event represents a condition as to whether the attribute of the base point event is the alarm or the operation. 2) The associated event represents a condition of the attributes of the plurality of events included as the associated events. For example, 'only alarm', 'only alarm or nothing', 'only operation', 'without condition' and the like may be set. Here, 'nothing' indicates a condition that there is no associated event, and 'without condition' indicates that an attribute of the associated event is not a condition and any attribute is possible.

3) The cause-side event is a condition relating to the attribute of the cause-side associated event and the conditional probability, and a condition of the conditional probability may be set in addition to the conditions of 'only alarm', 'only alarm or nothing', 'only operation', 'without condition' and the like relating to the attribute.

As the condition of the conditional probability, for example, a condition that a probability that the base point event will occur when the cause-side event has occurred is equal to or greater than a reference value, a condition that a probability that the cause-side event has occurred when the base point event occurred is equal to or greater than a reference value, a condition that both the probability that the base point event will occur when the cause-side event occurred and the probability that the cause-side event has occurred when the base point event occurred are equal to or greater than the reference values, without condition and the like may be set. When there is a plurality of the cause-side events, it is required that all the cause-side events should satisfy the condition. The reference values may be appropriately adjusted.

4) The effect-side event is a condition relating to the attribute of the effect-side associated event and the conditional probability, and a condition of the conditional probability may be set in addition to the conditions of 'only alarm', 'only alarm or nothing', 'only operation', 'without condition' and the like relating to the attribute.

As the condition of the conditional probability for example, a condition that a probability that the effect-side event will occur when the base point event occurred is equal to or greater than a reference value, a condition that a probability that the base point event has occurred when the effect-side event occurred is equal to or greater than a reference value, a condition that both the probability that the effect-side event will occur when the base point event occurred and the probability that the base point event has occurred when the effect-side event occurred are equal to or greater than the reference values, without condition and the like may be set. When there is a plurality of the effect-side events, it is required that all the effect-side events should satisfy the condition. The reference values may be appropriately adjusted.

For example, an alarm correspondence operation may be exemplified as the event of the improvement candidate. The alarm correspondence operation is a specific operation, which is to be performed when any alarm occurs. For example, the alarm correspondence operation is an operation for reinstating a state of the plane. By extracting the associated event group having the base point event as an improvement candidate, it is possible to automate the alarm correspondence operation and to readjust the setting of the alarm, thereby reducing an operator's load.

FIG. 15A shows an example of the improvement candidate pattern 154 corresponding to the alarm correspondence operation and FIG. 15B shows an example of the Bayesian network conforming to the pattern. In the improvement candidate pattern 154 corresponding to the alarm correspondence operation, the condition of 1) the base point event is 'operation', and the conditions of 3) the cause-side event are 'only alarm' and that the probability that the cause-side event has occurred when the base point event occurred is equal to or greater than the reference value. Regarding 2) the associated event and 4) the effect-side event, the conditions are not required because they are not necessary for determination.

Also, as the event of the improvement candidate, a neglected alarm may be exemplified. The neglected alarm is an alarm for which a correspondence operation is not performed even though an alarm has occurred. By extracting the associated event group of the base point event as the improvement candidate, it is possible to delete or readjust the alarm setting.

FIG. 16A shows an example of the improvement candidate pattern 154 corresponding to the neglected alarm, and FIGS. 16B and 16C show examples of the Bayesian network conforming to the pattern. In the improvement candidate pattern 154 corresponding to the neglected alarm, the condition of 1) the base point event is 'alarm', and the condition of 2) the associated event is 'only alarm or nothing'. Regarding 3) the cause-side event and 4) the effect-side event, the conditions are not required because they are not necessary for determination.

Also, as the event of the improvement candidate, a chain alarm may be exemplified. The chain alarm is a plurality of alarms occurring like a chain reaction with respect to one abnormal phenomenon. By extracting the associated event group of the base point event as the improvement candidate, it is possible to readjust the setting of the alarm unnecessarily occurring and to integrate the alarms.

Figures 17A, 17B:
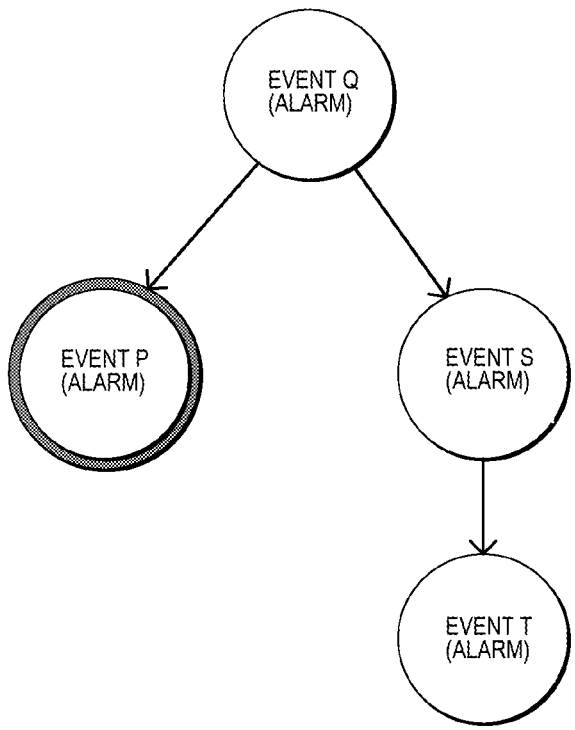
FIG. 17A shows an improvement candidate pattern corresponding to a chain alarm.
FIG. 17B shows an example of the Bayesian network conforming to an improvement candidate pattern shown in FIG. 17A.
Figure 19:
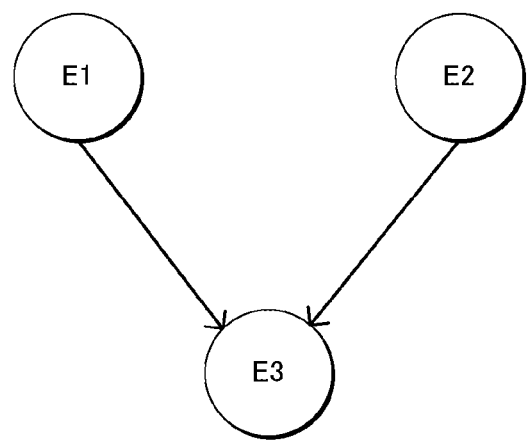
FIG. 19 shows an example of the Bayesian network.

FIG. 17A shows an example of the improvement candidate pattern 154 corresponding to the chain alarm, and FIG. 17B shows an example of the Bayesian network conforming to the pattern. In the improvement candidate pattern 154 corresponding to the chain alarm, the condition of 1) the base point event is 'alarm', and the condition of 2) the associated event is 'only alarm or nothing'. The conditions of 3) the cause-side event and 4) the effect-side event are 'only alarm or nothing'. In case of 'only alarm', the condition is that the probabilities of both directions are high.

The improvement candidate pattern 154 is not limited to the above examples and a variety of patterns can be adopted and added later. Also, it is possible to appropriately prepare and set the improvement candidate pattern 154 corresponding to a problem specific to the plant.

The pattern analysis unit 130 analyzes whether the prepared Bayesian network conforms to one of the improvement candidate patterns 154 (FIG. 11: S204). When there is the conforming improvement candidate pattern 154 (S205: Yes), the base point event of the corresponding Bayesian network is extracted as the improvement candidate (S206).

When there is an associated event group that has not been processed yet (S207: Yes), an associated event group of a processing target is set (S202) and the processing thereafter is repeated. When there is no associated event group that has not been processed yet (S207: No), the improvement candidate extraction processing (FIG. 5: S200) is over.

When the improvement candidate extraction processing (S200) is over, the display unit 140 displays the extracted improvement candidates (S300). FIG. 18A shows an example of the improvement candidate display screen. In FIG. 18A, a display of the base point event extracted with the improvement candidate pattern of the alarm correspondence operation, a display of the base point event extracted with the improvement candidate pattern of the chain alarm and a display of the base point event extracted with the improvement candidate pattern of the neglected alarm can be switched by taps.

For the displayed base point events, an occurrence frequency and a number of associated events are indicated. The base point event having an associated event is denoted with a triangular symbol. When the triangular symbol is instructed by a click operation, for example, the base point event is developed, so that the associated event is displayed.

The base point event is provided with a check column of a display target, and when a 'cause-and-effect relationship diagram display' button is clicked, the Bayesian network relating to the checked base point event is displayed, as shown in FIG. 18B.

In the display of the Bayesian network, as shown in FIG. 18C depicting explanatory notes thereof, the alarm event is represented by a circular node, the operation event is represented by a rectangular node, and occurrence frequencies are indicated in the nodes. Also, a directed line connecting the nodes is shown with a probability that an end point-side event will occur when a base point-side event of the directed line has occurred and a probability that the base point-side event has occurred when the end point-side event occurred.

Also, the display unit 140 may be configured to display not only the extracted events but also the information based on the prepared Bayesian networks. For example, when any alarm occurs upon the normal operation, if the Bayesian network in which the corresponding alarm is the base point event has been prepared, the display unit 140 may display the corresponding Bayesian network, an event, which is considered as a cause, an event that is highly likely to resultantly occur, an operation that is to be correspondingly performed and the like to the operator.

As described above, according to the event analysis apparatus 100 of the exemplary embodiment, the Bayesian network where the event group having a high degree of association is targeted is established on the basis of the event log, and the event conforming to the improvement candidate pattern is automatically extracted. For this reason, it is possible to support the operation of extracting the event of the improvement candidate on the basis of the cause-and-effect relationship of the event occurring in the plant.

What is claimed is:

1. An event analysis apparatus configured to analyze events collected from a controller in a distributed system including a plurality of field devices in a plant, the apparatus comprising:
    a processor configured to:
        calculate an individual occurrence probability of the events based on an event matrix, which represents presence and absence of occurrence of each of the events including an attribute indicating an alarm or an operator's operation in time series;
        generate a plurality of event pairs, each of the event pairs formed by combining two events, among the events collected from the controller;
        calculate a simultaneous occurrence probability between each of the event pairs based on the event matrix;
        calculate, as mutual information amount for each of the event pairs, a degree of association between the events based on the calculated individual occurrence probability of the events and the calculated simultaneous occurrence probability between the events;
        extract one or more event pairs, among the event pairs, having the mutual information amount greater than or equal to a reference value after the calculation of the mutual amount;
        integrate the extracted one or more event pairs and prepare an associated event group for each of the events, in which a specific event is set as a base point event and the base point event and an associated event having the degree of association greater than or equal to a threshold are grouped;
        establish a probabilistic cause-and-effect relationship model by a Bayesian network on the basis of the event matrix, for each of the associated event groups;
        receive a setting of improvement candidate patterns from a user, each of the improvement candidate patterns being a pattern in which a condition of an event to be set as an improvement candidate is determined based on an attribute of the base point event, an attribute of the associated event and a conditional probability between the base point event and the associated event; and
        extract, as an improvement candidate, the base point event of a probabilistic cause-and-effect relationship model conforming to any one of the improvement candidate patterns, from the established probabilistic cause-and-effect relationship models for each event; and
        display the extracted improvement candidate on a display unit.

2. The event analysis apparatus according to claim 1, wherein the processor is further configured to divide the event matrix into blocks having a predetermined reference time width, to calculate the individual occurrence probability of the events and the simultaneous occurrence probability between the events.

3. The event analysis apparatus according to claim 1, wherein the improvement candidate pattern distinguishes the associated event into a cause-side event and an effect-side event in relation to the base point event, and an attribute and a condition of a conditional probability are determined for each of the cause-side event and the effect-side event.

4. The event analysis apparatus according to claim 1, wherein one of the associated event groups does not have an associated event.

5. The event analysis apparatus according to claim 1, wherein the condition of the event to be set as the improvement candidate is set as any condition.

6. An event analysis method of analyzing events collected from a controller in a distributed system including a plurality of field devices in a plant, the method comprising:
    calculating an individual occurrence probability of the events based on an event matrix, which represents presence and absence of occurrence of each of the events including an attribute indicating an alarm or an operator's operation in time series;
    generating a plurality of event pairs, each of the event pairs formed by combining two events, among the events collected from the controller;
    calculating a simultaneous occurrence probability between each of the event pairs based on the event matrix;
    calculating, as mutual information amount for each of the event pairs, a degree of association between the events based on the calculated individual occurrence probability of the events and the calculated simultaneous occurrence probability between the events;
    extracting one or more event pairs, among the event pairs, having the mutual information amount greater than or equal to a reference value after the calculation of the mutual amount;
    integrating the extracted one or more event pairs and preparing an associated event group for each of the events, in which a specific event is set as a base point event and the base point event and an associated event having the degree of association greater than or equal to a threshold are grouped;
    establishing a probabilistic cause-and-effect relationship model by a Bayesian network on the basis of the event matrix, for each of the associated event groups;
    receiving a setting of improvement candidate patterns from a user, each of the improvement candidate patterns being a pattern in which a condition of an event to be set as an improvement candidate is determined based on an attribute of the base point event, an attribute of the associated event and a conditional probability between the base point event and the associated event; and extracting, as an improvement candidate, the base point event of a probabilistic cause-and-effect relationship model conforming to any one of the improvement candidate patterns, from the established probabilistic cause-and-effect relationship models for each event; and displaying the extracted improvement candidate on a display unit.

7. A computer program product, comprising: a non-transitory computer-readable medium comprising code for causing an information processing apparatus to execute a method for analyzing events collected from a controller in a distributed system including a plurality of field devices in a plant, the method comprising:

calculating an individual occurrence probability of the events based on an event matrix, which represents presence and absence of occurrence of each of the events including an attribute indicating an alarm or an operator's operation in time series;

generating a plurality of event pairs, each of the event pairs formed by combining two events, among the events collected from the controller;

calculating a simultaneous occurrence probability between each of the event pairs based on the event matrix;

calculating, as mutual information amount for each of the event pairs, a degree of association between the events based on the calculated individual occurrence probability of the events and the calculated simultaneous occurrence probability between the events;

extracting one or more event pairs, among the event pairs, having the mutual information amount greater than or equal to a reference value after the calculation of the mutual amount;

integrating the extracted one or more event pairs and preparing an associated event group for each of the events, in which a specific event is set as a base point event and the base point event and an associated event having the degree of association greater than or equal to a threshold are grouped;

establishing a probabilistic cause-and-effect relationship model by a Bayesian network on the basis of the event matrix, for each of the associated event groups;

receiving a setting of improvement candidate patterns from a user, each of the improvement candidate patterns being a pattern in which a condition of an event to be set as an improvement candidate is determined based on an attribute of the base point event, an attribute of the associated event and a conditional probability between the base point event and the associated event; and extracting, as an improvement candidate, the base point event of a probabilistic cause-and-effect relationship model conforming to any one of the improvement candidate patterns, from the established probabilistic cause-and-effect relationship models for each event; and displaying the extracted improvement candidate on a display unit.

\* \* \* \* \*